United States Patent Office 3,715,411
Patented Feb. 6, 1973

3,715,411
PREPARATION OF NITRILE/SILICONE RUBBER
John Day and David Kenneth Thomas, Farnham, England, assignors to Minister of Aviation Supply in Her Britannic Majesty's Government of United Kingdom of Great Britain and Northern Ireland, London, England
No Drawing. Filed Jan. 27, 1971, Ser. No. 110,277
Claims priority, application Great Britain, Feb. 4, 1970, 5,357/70
Int. Cl. C08g *47/10;* C08f *29/56*
U.S. Cl. 260—827
7 Claims

ABSTRACT OF THE DISCLOSURE

A process for the production of a nitrile/silicone specialty rubber which includes compounding a nitrile rubber which is a copolymer of butadiene and acrylonitrile containing 20 to 30 moles percent of acrylonitrile with a silicone rubber selected from fluorovinylsilicone, alkylsilicone, and methylvinylsilicone rubbers together with an amount of curing agent for said rubbers sufficient to effect the cure thereof, and conventional fillers and then curing the compounded nitrile/silicone rubber composition. Particularly useful compositions are obtained by compounding and curing 3,3,3-trifluoropropylmethylvinylsilicone with a medium nitrile rubber which is a copolymer of butadiene and acrylonitrile containing 25–30 moles percent of acrylonitrile, or by compounding and curing a nitrile rubber with a methyl vinylsilicone rubber which includes 0.15 to 0.56 mole percent of vinyl groups. Advantageously, the curing agent is an organic peroxide curing agent and a preferred curing agent is 2,5-dimethyl-2,5-ditertiarybutylperoxyhexane.

The present invention relates to specialty rubbers and is concerned with processes for the production of such rubbers having advantageous properties and with the rubbers produced thereby.

A specialty rubber, as the name suggests, is a rubber which has one or more advantageous properties which distinguish it from other rubbers and which make it particularly attractive for certain applications. For example, silicone rubbers have outstanding heat stability and exceptional low temperature properties, nitrile rubbers have excellent mechanical properties and outstanding resistance to fuels and certain fluids, and fluorosilicone rubbers have excellent fuel resistance and good low temperature properties.

A situation sometimes arises wherein a specialty rubber is suitable for a particular application except for the lack of a specific property. By use of the process of the present invention it may be possible to combine specialty rubbers in such a way that the good properties of the components are taken into the combined rubber.

In accordance with the present invention a process for the production of a nitrile/silicone specialty rubber having a composite network includes the steps of blending the nitrile and silicone, including fluorosilicone, components of the rubber together with a sufficient quantity of curing agent for the rubber to effect the cure thereof, and curing the compounded rubber.

The term composite network is used throughout this specification to apply to a blend of two (or more) rubbers which have been compounded and cured so that the vulcanised product is a combination of the component rubbers having a balance of properties differing from the balance of properties of each of the component rubbers and from which the component rubbers cannot be isolated. Nitrile rubber is used throughout the specification to mean a copolymer of butadiene and acrylonitrile, particularly copolymers containing of the order of 20 to 35 moles percent of acrylonitrile.

In one aspect the present invention comprises blending a nitrile rubber and a fluorovinylsilicone rubber together with an operative quantity of curing agent and advantageously the nitrile rubber is a medium nitrile rubber composed of a copolymer of butadiene and acrylonitrile containing of the order of 25–30% by weight of acrylonitrile and the fluorovinylsilicone rubber is 3,3,3-trifluoropropylmethylvinylsilicone rubber and preferably there is of the order of 20 to 70 parts by weight of medium nitrile rubber and of the order of 80 to 30 parts by weight of fluorovinylsilicon rubber in 100 parts by weight of rubber.

The product of this process may be useful in certain aircraft applications calling for a rubber having heat stability, good mechanical properties, fuel resistance and low temperature flexibility. Of the component rubbers, the medium nitrile rubber tends to lack the desired low temperature flexibility while the fluorovinylsilicone rubber tends to lack the desired mechanical properties but in a process of the present invention a composite network of the two may be produced having the desired properties. In a particularly preferred process there are present of the order of 40 parts by weight of medium nitrile rubber and of the order of 60 parts by weight of fluorovinylsilicone rubber.

In a further aspect the present invention comprises blending a nitrile rubber with an alkylsilicone rubber, preferably a methylvinylsilicone rubber containing of the order of 0.15 to 0.56 mole percent of vinyl groups, with an operative quantity of a curing agent. Advantageously there are of the order of 10 to 50 parts by weight of nitrile rubber and of the order of 90 to 50 parts by weight of methylvinylsilicone rubber in 100 parts by weight of rubber.

The curing agent may be any reagent or combination of reagents capable of vulcanising both of the component rubbers and is advantageously a peroxide curing agent, preferably 2,5 - dimethyl-2,5-ditertiarybutylperoxyhexane (Varox). The particular proportions of curing agent used will depend upon the level of cure desired and such knowledge is within the skill of the art. For example, an alkylsilicone cured by a peroxide curing such as benzoyl peroxide or cumene hydroperoxide will normally require 0.5 to 10 parts per hundred of rubber, whereas 2,5-dimethyl-2,5-ditertiarybutylperoxyhexane is specific for vinyl groups and the level of cure of a methylvinyl silicone cured by this curing agent is governed more by the vinyl content of the silicone than the proportion of curing agent present so long as there is at least 0.5 part per hundred parts of rubber present.

Conventional fillers may also be added during processes of the present invention in order to obtain desired properties, for example hardness, of the finally produced vulcanisate. The particular fillers used, and the proportions are not part of the present invention because selection of fillers and proportions thereof is within the skill of the art.

There will now be described, by way of example only, processes of blending nitrile and silicone rubbers within the present invention together with results showing the advantageous properties which may be obtained in the finally produced rubbers.

The first example relates to nitrile and fluorovinylsilicone rubbers and the second to nitrile and methylvinylsilicone rubbers.

EXAMPLE 1

The process was carried out as follows:
Using conventional rubber processing machinery a band of the silicone rubber was first formed on the hot rolls (120° C. or more) with the nip tightened up so as to form a large bank of rubber above the rolls. The nitrile rubber was then cut into small pieces (ca. 4 mm.²) and added to the band on the mill. The pieces of nitrile rubber collected in the bank and were left for 5 minutes to heat up. After this time the nip was opened slightly, this allowed the pieces of nitrile to travel into the band, then the filler was added. The polymers were blended by cutting and folding, the peroxide was added and also blended by passing several times through a tight nip. Vulcanisation was carried out in the normal fashion.

A series of rubbers were produced by the above process from 3,3,3-trifluoropropylmethylvinylsilicone (Dow Corning LS 420) and a medium nitrile rubber (Hycar 1042) to the formulation below.

Parts by weight
Silicone rubber variable } (1)
Medium nitrile rubber variable }
Silica filler (Aerosil) _____ 25
2,5 - dimethyl - 2,5 - ditertiarybutylperoxyhexane (Varox) _____ 5

¹ Totalling 100.

After compounding the rubber was cured under pressure for 1 hour at 160° C., and rubbers of various compositions had the properties set forth in Table 1 below.

TABLE 1

| Composition parts by weight nitrile | Tensile strength, $N/m.^2 \times 10^{-5}$ | M.100, $N/m.^2 \times 10^{-5}$ | Breaking elongation, percent | Hardness BS, degrees | Clash and Berg temperature, °C. |
|---|---|---|---|---|---|
| 0 | 66.2 | 33.1 | 170 | 72 | −67 |
| 20 | 60.7 | 53.7 | 110 | 91 | −59 |
| 40 | 75.8 | 50.3 | 177 | 84 | −33 |
| 50 | 93 | 46.2 | 215 | 81 | −24 |
| 70 | 137.9 | 41.4 | 295 | 77 | −19 |
| 90 | 131.6 | 40.0 | 270 | 76 | −18 |
| 100 | 118.5 | 35.2 | 215 | 74 | −17 |

NOTE.—M.100 is the stress at 100% strain.

The presence of a composite network in the above rubbers is clearly shown by the results of solubility and swelling measurements in ethyl acetate at 28° C. reported in Table 2 below.

TABLE 2

| Composition parts by weight nitrile | Percent soluble in ethyl acetate | Volume fraction of rubber in equilibrium swollen vulcanisate |
|---|---|---|
| 0 | 0.8 | 0.34 |
| 20 | 2.2 | 0.38 |
| 40 | 2.2 | 0.34 |
| 50 | 1.9 | 0.35 |
| 70 | 1.3 | 0.35 |
| 100 | 1.2 | 0.39 |

Unvulcanised fluorosilicone and nitrile polymers would be completely soluble in this solvent and the achievement of low solubility and swelling shown in Table 2 is proof of the true network structure of the composite and it demonstrates that the component materials are no longer physically separable.

Composites from fluorovinylsilicone and nitrile rubber will lose nothing in fluid and fuel resistance by comparison with the component materials, but can be produced with an attractive combination of low temperature flexibility and good mechanical properties. Typically the 60/40 composite of LS 420 and Hycar 1042 has a tensile strength of $75.8 \times 10^{-5}$ N/m.², an M.100 of $50.3 \times 10^{-6}$ N/m.², and a breaking extension of 177% coupled with a low temperature limit of −33° C. and the fuel resistance of a fluorovinylsilicon or nitrile rubber.

EXAMPLE 2

The compounding process described in Example 1 was repeated using the same medium nitrile rubber but compounding it with a methylvinylsilicone containing 0.2 moles percent of vinyl groups (I.C.I.—E.302) and composite rubbers of varying compositions had the properties shown in Table 3 below.

TABLE 3

| Composition, parts by weight nitrile | Tensile strength, $N/m.^2 \times 10^{-5}$ | M.100, $N/m.^2 \times 10^{-5}$ | Breaking elongation, percent | Hardness BS, degrees | Clash and Berg temperature, °C. |
|---|---|---|---|---|---|
| 0 | 52.4 | 15.16 | 340 | 65 | −73 |
| 20 | 61.4 | 37.9 | 195 | 88 | −69 |
| 40 | 66.9 | 49.3 | 166 | 88 | −47 |
| 50 | 66.0 | 46.86 | 182 | 86 | −42 |
| 70 | 113.7 | 48.28 | 278 | 81 | −20 |
| 90 | 133 | 47.59 | 290 | 80 | −19 |
| 100 | 117.9 | 35.85 | 265 | 74 | −18 |

A striking feature of these results is the large effect which relatively small proportion of nitrile rubber can have on the tensile mechanical properties of a methylvinylsilicone without adversely affecting the low temperature properties. For example, the introduction of 20% by weight of nitrile rubber into E.302 leads to an increase of 17% in tensile strength, 151% in tensile modulus, and 35% in hardness with virtually no change in Clash and Berg temperature. These limited additions of nitrile rubber to silicone rubber also have a significant effect on the important property of tear strength.

The tear strength of an E.302 vulcanisate containing 25 parts of Aerosil is raised by over 100% by the introduction of 20 parts of Hycar 1042 and co-vulcanisation.

We claim:

1. A process for the production of a nitrile/silicone specialty rubber having a composite network which comprises compounding (a) a nitrile rubber which is a copolymer of butadiene and acrylonitrile containing 20 to 30 moles percent of acrylonitrile, (b) a silicone rubber selected from the group of 3,3,3-trifluoropropylmethylvinylsilicone rubbers and methylvinylsilicone rubbers containing 0.15 to 0.56 mole percent of vinyl groups, (c) an amount of organic peroxide curing agent for said rubbers sufficient to effect the cure thereof, and (d) conventional rubber fillers, and curing said compounded nitrile/silicone rubber composition.

2. The process as claimed in claim 1 wherein the silicone rubber is a 3,3,3-trifluoropropylmethylvinylsilicone rubber, the nitrile rubber is a medium nitrile rubber which is a copolymer of butadiene and acrylonitrile containing 25 to 30 moles percent of acrylonitrile.

3. The process as claimed in claim 2 wherein there are 20 to 70 parts by weight of medium nitrile rubber and 80 to 30 parts by weight of 3,3,3-trifluoropropylmethylvinylsilicone rubber in 100 parts by weight of rubber used in the process.

4. The process as claimed in claim 3 wherein the curing agent is 2,5-dimethyl-2,5-ditertiary-butylperoxyhexane and is present to the extent of five parts by weight per hundred parts of rubber.

5. The process as claimed in claim 2 wherein there are present about 40 parts by weight of medium nitrile rubber and about 60 parts by weight of 3,3,3-trifluoropropylmethylvinylsilicone per hundred parts by weight of rubber used in the process and the curing agent is 2,5-dimethyl-2,5-ditertiarybutylperoxyhexane in a proportion of about 5 parts by weight per hundred parts by weight of rubber used in the process.

6. The process as claimed in claim 1 wherein there is present 10 to 50 parts by weight of nitrile rubber and 90 to 50 parts by weight of methylvinylsilicone rubber in 100 parts by weight of rubber used in the process.

7. The process as claimed in claim 6 wherein the curing agent is 2,5-dimethyl-2,5-ditertiarybutylperoxyhexane and is present to the extent of 5 parts by weight per 100 parts by weight of rubber.

References Cited

UNITED STATES PATENTS

| | | | |
|---|---|---|---|
| 2,878,195 | 3/1959 | Hurd | 260—827 |
| 3,021,292 | 2/1962 | Hurd et al. | 260—827 |

OTHER REFERENCES

W. Noll: "Chemistry and Technology of Silicones," Academic Press, N.Y., publ., 1968, pp. 388–395.

SAMUEL H. BLECH, Primary Examiner

U.S. Cl. X.R.

260—31.2 N, 31.2 MR, 37 SB, 41 R, 41 A